United States Patent [19]
Yates et al.

[11] 4,238,540
[45] Dec. 9, 1980

[54] FIBER REINFORCED COMPOSITE SHAFT WITH METALLIC CONNECTOR SLEEVES MOUNTED BY CONNECTOR RING INTERLOCK

[75] Inventors: Derek N. Yates, Los Gatos; John C. Presta, San Jose, both of Calif.

[73] Assignee: Celanese Corporation, New York, N.Y.

[21] Appl. No.: 43,556

[22] Filed: May 29, 1979

[51] Int. Cl.³ .............................. B32B 5/12; F16C 1/02
[52] U.S. Cl. .................................. 428/36; 64/1 R; 64/1 S; 156/172; 156/173; 156/175; 156/189; 428/367
[58] Field of Search ............... 156/172, 189, 173, 175, 156/425; 273/80 R; 64/1 R, 1 S, 2 R, 16, 27 R; 428/36, 367; 285/91; 138/130, 131, 144, 132, DIG. 2

[56] References Cited

U.S. PATENT DOCUMENTS

| | | | |
|---|---|---|---|
| 2,882,072 | 4/1959 | Noland | 138/138 |
| 3,466,895 | 9/1969 | Cartwright | 64/1 R |
| 3,592,884 | 7/1971 | Williams | 64/1 R |
| 3,661,670 | 5/1972 | Pierpont, Jr. | 156/172 |
| 4,041,599 | 8/1977 | Smith | 29/451 |
| 4,089,190 | 5/1978 | Worgan et al. | 64/1 R |
| 4,097,626 | 6/1978 | Tennent | 428/36 |
| 4,171,626 | 10/1979 | Yates et al. | 428/36 |

FOREIGN PATENT DOCUMENTS 1356393  6/1974  United Kingdom ................ 156/189

*Primary Examiner*—William J. Van Balen
*Attorney, Agent, or Firm*—Kenneth A. Genoni

[57] ABSTRACT

A tubular fiber reinforced composite shaft is formed (as described) which integrally incorporates a metal sleeve or connection at the end thereof. Initially a metal sleeve having longitudinal grooves is positioned upon a segment of a mandrel. The grooves are inclined in a direction extending longitudinally inwardly and radially outwardly. Fibrous material bearing a non-solidified resinous material is applied around the mandrel and around the grooves in the sleeve. An annular lock ring having radially inwardly projecting ridges is inserted axially over the fibrous material whereby the ridges press the fibrous material into the grooves in the sleeve. The resinous material is then solidified to form a tubular composite shaft whereby a torsion-transmitting connection is made with the sleeve.

21 Claims, 12 Drawing Figures

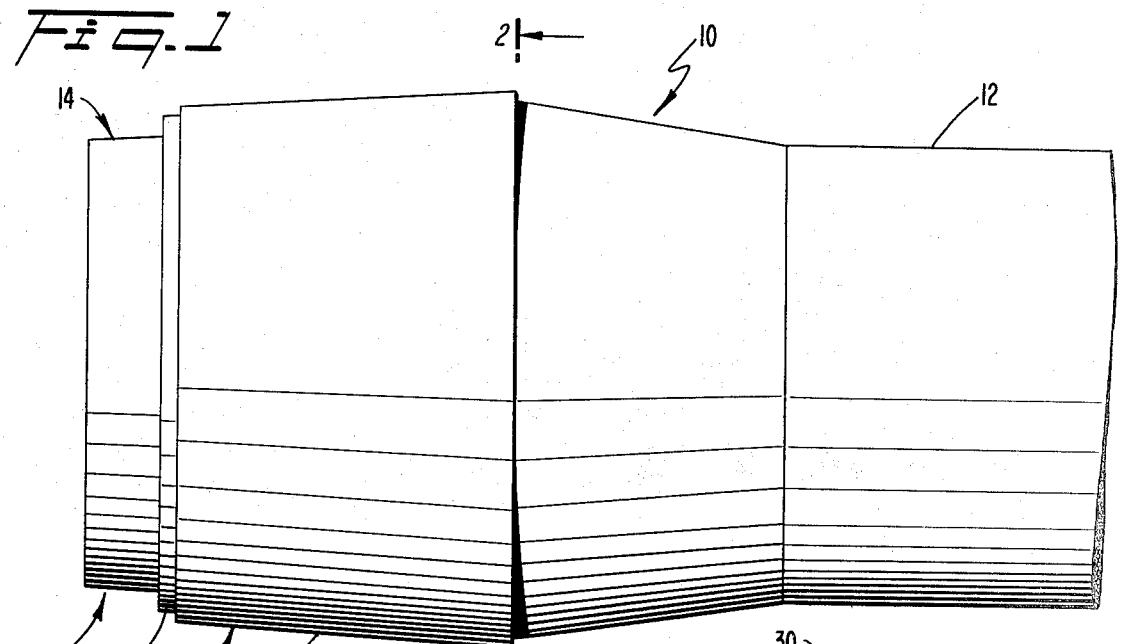
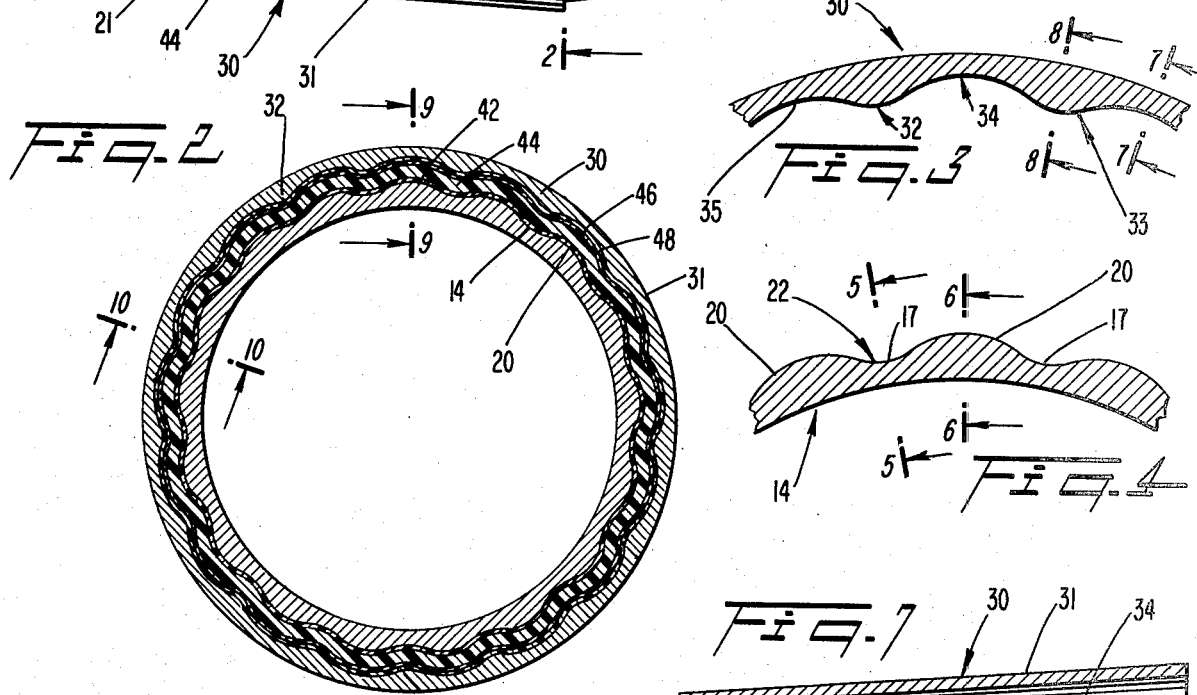
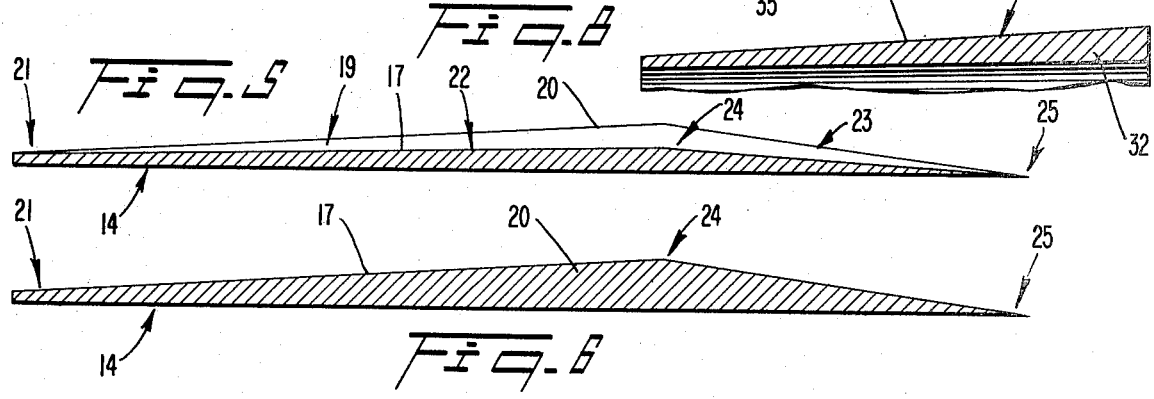

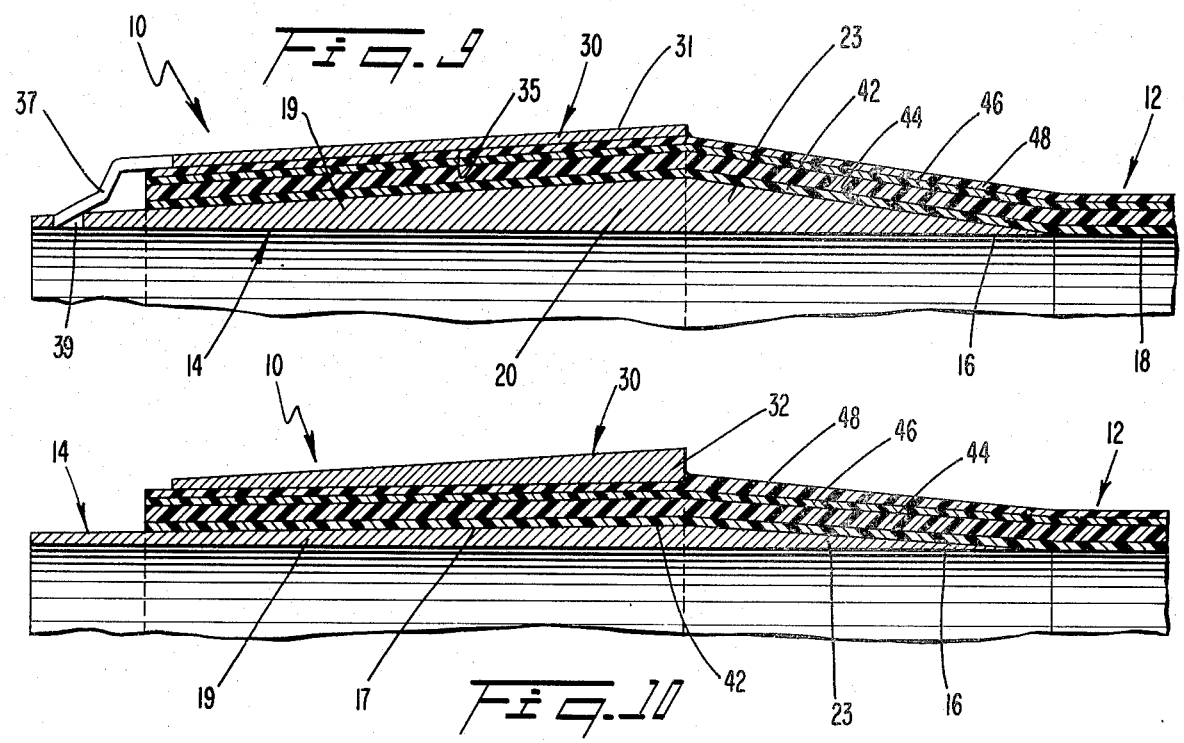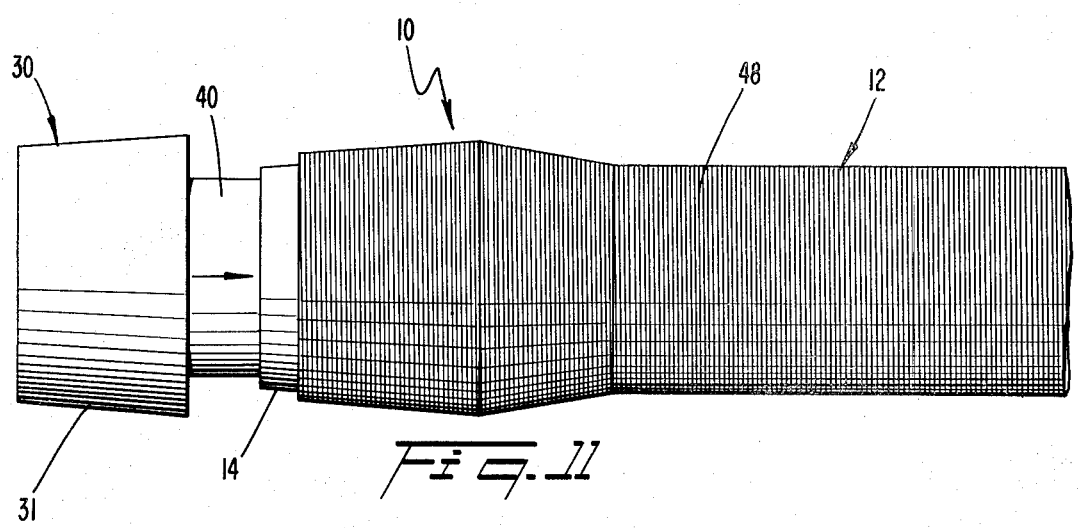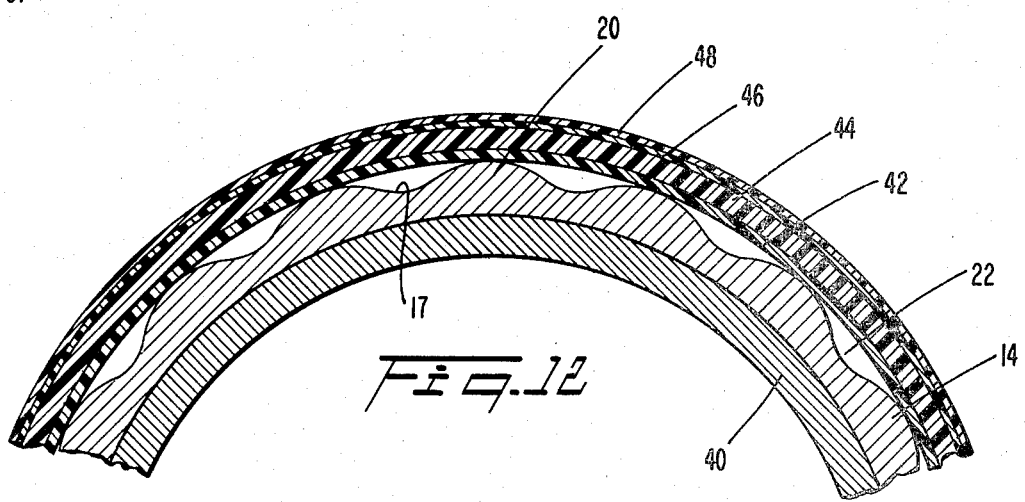

FIBER REINFORCED COMPOSITE SHAFT WITH METALLIC CONNECTOR SLEEVES MOUNTED BY CONNECTOR RING INTERLOCK

BACKGROUND AND OBJECTS OF THE INVENTION

This invention relates to fiber reinforced composite shafts and, more especially, to vehicle drive shafts comprising a fiber reinforced resinous shaft body with metallic coupling sleeves mounted at the ends thereof.

Tubular fiber reinforced composites have been heretofore proposed, as demonstrated by U.S. Pat. Nos. 2,882,072 issued to Noland on Apr. 14, 1959, and 3,661,670 issued to Pierpont on May 9, 1972, and in British Pat. No. 1,356,393 issued on June 12, 1974. In the Pierpont patent, for example, it has been proposed to form such composites from a resinous material which is reinforced by glass fibers. In particular, filaments bearing a non-hardened resinous material (i.e., an uncured thermosetting resin) are wound around a mandrel until the desired thickness has been established. The reinforcing fibers can be positioned within the wall of the tubular composite in varying angular relationships. Thereafter, the resinous material is solidified (i.e., is cured). A premolded threaded end portion can be mounted at the ends of the tubular composite, such as by the winding of filaments directly around the end portion during the winding process.

It recently has been proposed to form vehicle drive shafts from tubular fiber reinforced composites, as demonstrated by U.S. Pat. No. 4,041,599 issued to Smith on Aug. 16, 1977, and published Japanese Application No. 52-127542, entitled "Carbon Fiber Drive Shaft" which claims priority for the filing of U.S. Ser. No. 676,856 on Apr. 14, 1976 of Gordon Peter Worgan et al (now U.S. Pat. No. 4,089,190). In the Japanese application filaments bearing a non-hardened resinous material (e.g., an uncured thermosetting resin) are wound around a mandrel until the desired thickness has been established, whereupon the resinous material is cured. Zones or layers are positioned circumferentially within the wall of the shaft in the specific angular relationships there disclosed.

The above-mentioned Smith patent proposes the attachment of a carbon fiber reinforced epoxy drive shaft directly to a universal joint extension by a specific bonding technique.

Fiber reinforced composite shafts exhibit advantages over metallic shafts, i.e., they are lighter in weight, more resistant to corrosion, stronger, and more inert.

In copending application Ser. No. 890,232 filed Mar. 27, 1978, now U.S. Pat. No. 4,171,626 of Derek N. Yates and David B. Rezin, entitled "Improved Carbon Fiber Reinforced Composite Drive Shaft", a fiber reinforced composite drive shaft is disclosed which exhibits improved service characteristics and the necessary strength and durability to withstand the various stresses encountered during vehicle operation. The disclosure of that copending application is herein incorporated by reference as if set forth at length.

Since direct welding or bonding of a resin shaft to metal does not normally create a sufficiently strong and durable connection on a consistent and reliable basis, the use of metallic connector sleeves mounted at the ends of the shaft in accordance with the concept of the present invention provides a means for accomplishing a secure welded connection similar to that utilized with conventional metallic shafts.

The high torque loads which are to be transmitted by a vehicle drive shaft require that an extremely strong and durable torsional drive connection be established between the sleeves and shaft body. Previous proposals for mounting sleeves by employing adhesives or by wrapping the filament bundles around circumferential grooves on the sleeve periphery, cannot be relied upon to provide a connection of the requisite strength and durability.

It is, therefore, an object of the present invention to provide a novel, fiber reinforced resin shaft which minimizes or obviates problems of the types discussed above.

It is an additional object of the invention to provide a novel, fiber reinforced resin shaft suitable for use as a drive shaft in a vehicle power train.

It is a further object of the invention to provide novel methods and apparatus for securing metal connector sleeves to the ends of fiber reinforced resin shafts to enable the shafts to transmit high torsional loads.

BRIEF SUMMARY OF THE INVENTION

These objects of the present invention are achieved by a tubular fiber reinforced composite shaft, and a method for making same wherein a metal sleeve is provided having longitudinally extending, circumferentially spaced grooves on an outer periphery thereof which are each inclined in a direction extending longitudinally inwardly and radially outwardly. This sleeve is positioned upon a segment of a mandrel. Fibrous material bearing a non-solidified resinous material is applied to the mandrel and over the grooves in the sleeve. An annular lock ring is provided having longitudinally extending, circumferentially spaced ridges on an inside periphery thereof which are each inclined in a direction extending longitudinally inwardly and radially outwardly. This lock ring is inserted over the sleeve and fibrous material applied thereto, with the ridges overlying the grooves in the sleeve to press portions of the fibrous material into the grooves. The resinous material is solidified with portions of the previously applied resinous material being positioned in the grooves to create a torsion-transmitting connection with the metal sleeve. Thereafter, the mandrel is removed.

THE DRAWING

The advantages of the present invention will become apparent from the accompanying detailed description of a preferred embodiment thereof in connection with the accompanying drawings in which like numerals designate like elements and in which:

FIG. 1 is a side elevational view of one end of a composite drive shaft formed in accordance with the present invention;

FIG. 2 is a cross-sectional view of the drive shaft taken along line 2—2 of FIG. 1;

FIG. 3 is a fragmentary cross-sectional view of a lock ring according to the present invention;

FIG. 4 is a fragmentary cross-sectional view of a metal sleeve according to the present invention;

FIG. 5 is a fragmentary longitudinal sectional view taken through a groove in the sleeve along line 5—5 of FIG. 4;

FIG. 6 is a fragmentary longitudinal sectional view taken through a rib on the sleeve along line 6—6 of FIG. 4;

FIG. 7 is a fragmentary longitudinal sectional view taken through a recess in the lock ring along line 7—7 in FIG. 3;

FIG. 8 is a fragmentary longitudinal sectional view taken through a ridge on the lock ring along line 8—8 in FIG. 3;

FIG. 9 is a partial longitudinal sectional view of the drive shaft taken through a ridge of the lock sleeve and a groove in the sleeve, along line 9—9 in FIG. 2, and depicting optional lock tabs for mechanically securing the lock ring to the sleeve;

FIG. 10 is a partial longitudinal sectional view of the driven shaft taken through a recess of the lock ring and a rib of the sleeve, along line 10—10 of FIG. 2;

FIG. 11 is a side elevational view depicting the axial insertion of the lock ring onto the shaft body; and FIG. 12 is a partial cross-sectional view of the drive shaft subsequent to application of fibrous material and prior to insertion of the lock ring.

DETAILED DESCRIPTION OF THE PREFERRED EMBODIMENT OF THE INVENTION

A drive shaft 10 according to the present invention comprises a reinforced resin shaft body 12 of cylindrical cross-section, and a metal connector sleeve 14 secured preferably at each end of the shaft body.

The connector sleeve 14 is generally cylindrical and formed of an appropriate metal, such as steel or aluminum for example. The sleeve includes an inner annular surface 16 of constant diameter which is substantially contiguous with an inner surface 18 of the shaft body located longitudinally inwardly thereof, as is evident from FIG. 9.

The sleeve includes a sinuous outer periphery formed by alternating ribs 20 and grooves 22 which are arranged in longitudinally extending, circumferentially spaced relationship.

The floor portion 17 of each groove 22 is inclined in a direction extending longitudinally inwardly and radially outwardly along a longitudinally outer extent 19 of the sleeve. The outer extent 19 of the sleeve extends from the longitudinally outermost end of the sleeve to an intermediate location 24. Along a longitudinally inner extent 23 of the sleeve the floors of the grooves are each inclined in a direction extending longitudinally and radially inwardly. This inner extent 23 of the sleeve extends from the intermediate location 24 to the longitudinally innermost end 25 of the sleeve.

Thus, the grooves 22 extend longitudinally inwardly and radially outwardly along the outer extent 19, and longitudinally and radially inwardly along the inner extent 23, thereby forming a double taper on opposite longitudinal sides of the intermediate location 24.

The ribs 20 are each inclined in a direction extending longitudinally inwardly and radially outwardly along the outer extent 19 of the sleeve, and are inclined in a direction extending longitudinally and radially inwardly along the inner extent 23 of the sleeve. The radial thickness of each rib 20 increases in a longitudinally inward direction up to the intermediate location 24 and thereafter decreases.

Thus, the ribs 20 form a double taper on opposite longitudinal sides of the intermediate location 24.

The inclination of the grooves 22 along the outer extent 19 of the sleeve is not as steep as the inclination of the ribs 20 along the same extent of the sleeve. Accordingly, the radial depth of each groove increases in a longitudinally inward direction up to the intermediate location 24 and thereafter decreases.

As will be explained subsequently in greater detail, fibrous material is applied around the sleeve and around the grooves, and is thereafter pressed into the grooves to establish a torsion-transmitting connection with the sleeve. This pressing of the fibrous material is accomplished by means of an annular lock ring 30, preferably formed of metal.

The outer periphery 31 of the lock ring is of generally frusto-conical configuration. The inner periphery 33 of the lock ring is sinuous and is formed by alternating ridges 32 and recesses 34 which are arranged in longitudinally extending, circumferentially spaced relationship. The number and spacing of the ridges 32 corresponds to the number and spacing of the grooves 22 in the sleeve.

The ridges 32 are each inclined in a direction extending longitudinally inwardly and radially outwardly. The angle of inclination of such ridges corresponds to the angle of inclination of the grooves 22 along the outer extent of the sleeve.

The floor 35 of each recess 34 is inclined in a direction extending longitudinally inwardly and radially outwardly. The angle of this inclination corresponds to the angle of inclination of the ribs 20 along the outer extent of the sleeve.

The longitudinal length of the lock ring 30 is no greater than, and preferably less than, the length of the outer extent 19 of the sleeve.

At any cross-section taken along the length of the lock ring 30, the inner diameter of the lock ring as formed by the ridges 32 is larger than the outer diameter of a correspondingly located cross-section of the sleeve as formed by the grooves 22, by an amount corresponding to the expected thickness of the fibrous material. This same relationship exists between the inner diameter of the lock ring formed by the recesses 34 and the outer diameter of the sleeve formed by the ribs 20.

The outermost end of the lock ring 30 may include a plurality of cicumferentially spaced tabs 37, and the sleeve 14 may include a like number of circumferentially spaced apertures 39 for reasons to be explained.

During fabrication of a preferred form of the shaft, a pair of connector sleeves are positioned on a mandrel 40 in longitudinally spaced relationship. The sleeves engage the mandrel 40 somewhat snugly, but loosely enough to be removable therefrom. An appropriate clamping arrangement holds the sleeves 14 in place. The mandrel is coated with a release substance to resist the adherence thereto of resin or adhesives. Thereafter, the shaft body 12 is formed around both the mandrel and sleeve.

Construction of the shaft body 12 is preferably performed in a manner more fully described in the aforementioned application of Yates and Rezin. Summarized briefly, layers of fiber reinforced resin-impregnated material are applied, preferably in the form of bundles of substantially parallel continuous filaments bearing a non-solidified (i.e., liquid, soft and tacky, or molten) resinous material. The bundles can be dipped in an uncured liquid thermosetting resin, such as an epoxy resin, and then wound around the mandrel in multiple passes until a layer of desired thickness is established. Attention is further directed to U.S. Pat. Nos. 3,661,670, 3,202,560, and 3,231,442 for additional details concerning possible arrangements for the clamping of sleeves and winding of filament bundles. The disclosures of these patents are incorporated herein by reference as if set forth at length.

The term "layer" as used herein specifies a circumferential zone within the wall of the tubular drive shaft wherein the fibrous reinforcement is disposed in a specific configuration and differs from the adjacent zone(s) with respect to the configuration and/or composition of the fibrous reinforcement. A single layer may include a multiple pass alignment or buildup of fibrous reinforcement in a given configuration. The term layer encompasses an alignment wherein the fibrous reinforcement is disposed therein at both plus and minus a given angle which optionally can be built-up in multiple passes.

The fibers reinforce the themoset resin matrix to impart necessary properties of strength and durability to the shaft. In this regard, glass fibers (e.g., E-glass or S-glass) and carbon fibers (i.e., either amorphous or graphitic) materials are preferred. The carbon fibers commonly contain at least 90 percent carbon by weight, and preferably at least 95 percent carbon by weight. Additionally preferred carbon fibers have a Young's modulus of elasticity of at least 25 million psi (e.g., approximately 30 to 60 million psi).

The plies of filament bundles are wound in various orientation relative to the longitudinal axis of the drive shaft, and can be built-up to different thicknesses respectively. Preferably, an initial layer of glass fibers is applied at an angle of from $\pm 30°$ to $\pm 50°$ relative to a line parallel to the longitudinal axis of the shaft. Next, a layer of glass fibers is applied at an angle of from 0° to $\pm 15°$. Thereafter, a layer of carbon fibers is applied at an angle of from 0° to $\pm 15°$. Then a layer of glass fibers is applied at about an angle of from about $\pm 60°$ to 90°.

Of course the number and composition of layers, as well as their orientation and thickness may vary, depending upon the characteristics desired to be imparted to the shaft.

Rather than utilizing filament winding (e.g, wet winding or prepreg winding), other tube forming procedures can be employed, such as tube rolling, tape wrapping, or pultrusion, for example. In the former step, comparatively wide sections of resin impregnated tape are precut to patterns, stacked in sequence, and rolled onto the mandrel.

After the layers have been applied, the non-solidified resin is cured. In this regard, the resin may be of a self-curing type, or may be of a kind which cures in response to being subjected to heat and/or curing agent.

Relating more particularly to the present invention, the sleeve(s) 14 is positioned on a segment of the mandrel 40. Thereafter, an initial layer 42 of glass fibers is wound around the mandrel and sleeves at about a $\pm 45$ degree angle.

Thereafter, a layer 44 of glass fibers is wound around the layer 42 at about a zero degree angle.

Next, a layer 46 of carbon fibers is wound around the layer 44 at about a zero degree angle.

Finally, a layer 48 of glass fibers is wound at about a 90 degree angle around the layer 46.

It will be understood that any number of layers can be applied and at various angles and thicknesses, depending upon desired shaft characteristics.

The fibers are applied less tightly around those portions of the grooves 22 located along the outer extent 19 of the sleeve. In this fashion, the fibers may be more easily pressed into the grooves in a manner to be discussed.

Following the fiber-applying steps, the shaft appears as depicted in FIG. 12 with the innermost layer 42 spaced radially outwardly of the grooves 22.

Then, the lock ring 30 is axially inserted over the front portion of the sleeve and onto the fibrous material disposed therearound (see FIG. 11). The ridges 32 of the lock ring 30 function in wedge-like fashion to forcefully press the loosely-applied fibrous material radially inwardly so that at least the innermost layer 42, or a portion thereof, physically enters the grooves 22 (see FIG. 2). Thus, the composite, or fibrous material, is constrained to follow the outside contour of the sleeve.

The lock ring is held in this position in any suitable manner, such as by connection with an external fixture (not shown). At the same time, the non-solidified resin is cured to bond the layers together to form an integral composite, and the shaft is removed from the mandrel.

Following the curing step, the lock ring 30 will be securely anchored to the shaft. If desired, this anchoring may be augmented by bending the tabs 37 into the apertures 39 in the sleeve. The tabs 37 thus engage the walls of the apertures to resist longitudinal displacement of the lock ring relative to the sleeve. It is to be understood that the use of tabs 37 is optional.

As illustrated in FIG. 1, an axially outer portion 36 of the sleeve 14 is exposed, preferably by removing portions of the layers.

The sleeves 14 facilitate connection of the shaft to metal components such as metal yokes in a vehicle power train, since direct metal-to-metal welding contact is possible.

It will be appreciated that the presence of the fibrous material in the grooves 22 provides a mechanical interlock between the sleeve and the shaft body capable of transmitting torsional forces therebetween. The lock ring 30 forms a permanent part of the drive shaft and assures that the fibers are permanently disposed within the grooves 22.

Axial dislodgment of the sleeve is prevented by the radial gripping action between the lock ring 30, the fibrous material, and the grooves 22, as well as by the longitudinal double taper in the sleeve.

The optional use of the locking tabs 37 provides an added safeguard against dislodgment of the lock ring 30.

Although not necessary, it might be desirable to apply an adhesive between the sleeve 14 and initial layer 42 of fibrous material to augment the connection therebetween.

Although the mechanical lock concept of the present invention is disclosed in conjunction with a particular shaft body, it is to be understood that this concept has utility with composite shafts in general wherein fibrous reinforcement is present in a resinous matrix material.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method of forming a tubular reinforced composite shaft comprising the steps of:
providing a metal sleeve having longitudinally extending, circumferentially spaced grooves on an outer periphery thereof which are each inclined in a direction extending longitudinally inwardly and radially outwardly;

positioning said sleeve upon a segment of a mandrel;

applying fibrous material bearing a non-solidified resinous material upon said mandrel and over said grooves in said sleeve;

providing an annular lock ring having longitudinally extending, circumferentially spaced ridges on an inside periphery thereof which are each inclined in a direction extending longitudinally inwardly and radially outwardly;

inserting said lock ring over said sleeve and fibrous material applied thereto, with said ridges overlying said grooves in said sleeve to press portions of said fibrous material into said grooves;

solidifying said resinous material with portions of said previously applied resinous material being positioned in said grooves to create a torsion-transmitting connection with said metal sleeve; and removing said mandrel.

2. A method according to claim 1, further including the step of mechanically connecting said ring directly to said sleeve subsequent to said inserting step.

3. A method according to claim 2, wherein said mechanically connecting step comprises bending a plurality of tabs on said ring into associated apertures in said sleeve.

4. A method according to claim 1, wherein said step of providing a metallic sleeve further comprises providing a sleeve whose grooves are defined by circumferentially spaced, longitudinally extending ribs which are each inclined in a direction extending longitudinally inwardly and radially outwardly; said step of providing a lock ring further comprising providing a lock ring whose ridges are disposed between longitudinally extending, circumferentially spaced recesses which are each inclined in a direction extending longitudinally inwardly and radially outwardly.

5. A method according to claim 4, wherein said step of providing a metal sleeve further comprises providing a sleeve whose ribs are inclined at a steeper angle than said grooves such that the radial depth of each groove increases in a longitudinally inward direction.

6. A method according to claim 4, wherein said step of providing a metal sleeve further comprises providing a sleeve whose grooves are each inclined in a direction extending longitudinally inwardly and radially outwardly along a longitudinally outer extent of the sleeve, and are inclined in a direction extending longitudinally and radially inwardly along a longitudinally inner extent of the sleeve; and whose ribs are each inclined in a direction extending longitudinally inwardly and radially outwardly along said longitudinally outer extent of said sleeve; and inclined in a direction extending longitudinally and radially inwardly along said longitudinally inner extent of said sleeve.

7. A method according to claim 6 wherein said step of providing a metal sleeve further comprises providing a metal sleeve whose grooves have an inclination along said longitudinally inner extent which is steeper than the inclination of said ribs along such extent.

8. A method of forming a tubular reinforced composite drive shaft comprising the steps of:

providing a metal sleeve having longitudinally extending, circumferentially spaced grooves and ribs on an outer periphery thereof, each of said ribs and grooves being inclined in a direction extending longitudinally inwardly and radially outwardly along a longitudinally outer extent of said sleeve, and inclined in a direction extending longitudinally and radially inwardly along a longitudinally inner extent of said sleeve;

positioning said sleeve upon a segment of a mandrel;

applying fibrous material bearing a non-solidified resinous material upon said mandrel and over said grooves in said sleeve along said inner and outer extents of said sleeve;

providing an annular lock ring having longitudinally extending, circumferentially spaced ridges and recesses on an inside periphery thereof, each of said ridges and recesses being inclined in a direction extending longitudinally inwardly and radially outwardly;

inserting said lock ring over said outer extent of said sleeve and over said fibrous material applied thereto, with said ridges overlying said grooves in said sleeve to press portions of said fibrous material into said grooves;

solidifying said resinous material with portions of said previously applied resinous material positioned in said grooves to create a torsiontransmitting connection with said metal sleeve; and removing said mandrel.

9. A method according to claim 8 and further including the step of inserting lock tabs of said lock ring into apertures in said sleeve.

10. A method of forming a tubular reinforced composite shaft comprising the steps of:

providing a metal sleeve having longitudinally extending, circumferentially spaced grooves on an outer periphery thereof;

positioning said sleeve upon a segment of a mandrel;

applying fibrous material bearing a non-solidified resinous material upon said mandrel and over said grooves in said sleeve;

providing an annular lock ring having longitudinally extending, circumferentially spaced ridge means on an inside periphery thereof;

inserting said lock ring over said sleeve and fibrous material applied thereto, with said ridge means overlying said grooves in said sleeve to press portions of said fibrous material into said grooves;

solidifying said resinous material with portions of said previously applied resinous material being positioned in said grooves to create a torsion-transmitting connection with said metal sleeve; and removing said mandrel.

11. A tubular reinforced composite shaft comprising:

a shaft body comprising a plurality of integrally bonded circumferential plies of solidified fiber reinforced resinous material;

a metal sleeve mounted in at least one end of said shaft body, said sleeve including a plurality of circumferentially spaced, longitudinally extending grooves on an outer periphery of said sleeve;

an annular lock ring positioned upon said sleeve and upon said plies of fibrous material disposed therearound, said lock ring including a plurality of circumferentially spaced, longitudinally extending ridge means on an inside periphery thereof;

said ridge means being disposed in overlying relation to said grooves in said sleeves to press portions of said fibrous material into said grooves thereby forming a torsion-transmitting connection therebetween.

12. A hollow tubular reinforced composite shaft comprising:
   a shaft body comprising a plurality of integrally bonded circumferential plies of solidified fiber reinforced resinous material;
   a metal sleeve mounted in at least one end of said shaft body, said sleeve including a plurality of circumferentially spaced, longitudinally extending grooves on an outer periphery of said sleeve;
   said grooves each being inclined in a direction extending longitudinally inwardly and radially outwardly;
   an annular lock ring positioned upon said sleeve and upon said plies of fibrous material disposed therearound, said lock ring including a plurality of circumferentially spaced, longitudinally extending ridges on an inside periphery thereof;
   said ridges each being inclined in a direction extending longitudinally inwardly and radially outwardly, and being disposed in overlying relation to said grooves in said sleeves to press portions of said fibrous material into said grooves thereby forming a torsion-transmitting connection therebetween.

13. A shaft according to claim 12, further including means mechanically connecting said lock ring directly to said metal sleeve.

14. A shaft according to claim 13, wherein said last-named means comprises a plurality of tabs on said ring which are received in associated apertures in said sleeve.

15. A shaft according to claim 12, wherein said grooves are defined by circumferentially spaced, longitudinally extending ribs which are each inclined in a direction extending longitudinally inwardly and radially outwardly; said ridges of said lock ring being disposed between longitudinally extending, circumferentially spaced recesses which are each inclined in a direction extending longitudinally inwardly and radially outwardly.

16. A shaft according to claim 15, wherein said ribs on said sleeve are inclined at a steeper angle than said grooves such that the radial depth of each groove increases in a longitudinally inward direction.

17. A shaft according to claim 15, wherein said grooves in said sleeve are each inclined in a direction extending longitudinally inwardly and radially outwardly along a longitudinally inner extent of the sleeve, and are inclined in a direction extending longitudinally and radially inwardly along a longitudinally inner extent of the sleeve; and said ribs on said sleeve each being inclined in a direction extending longitudinally inwardly and radially outwardly along said longitudinally outer extent of said sleeve, and inclined in a direction extending longitudinally and radially inwardly along said longitudinally inner extent of said sleeve.

18. A shaft according to claim 17, wherein the inclination of said grooves along said longitudinally inner extent is steeper than the inclination of said ribs along such extent.

19. A hollow tubular reinforced composite drive shaft comprising:
   a shaft body comprising a plurality of integrally bonded circumferential plies of solidified fiber reinforced resinous material;
   a metal sleeve mounted in at least one end of said shaft body, said sleeve including a plurality of circumferentially spaced, longitudinally extending grooves and ribs on an outer periphery thereof;
   said grooves and ribs each being inclined in a direction extending longitudinally inwardly and radially outwardly along a longitudinally outer extent of said sleeve, and inclined in a direction extending longitudinally and radially inwardly along a longitudinally inner extent of said sleeve;
   an annular lock ring positioned upon said outer extent of said sleeve and upon said plies of fibrous material disposed therearound, said lock ring including a plurality of circumferentially spaced, longitudinally extending ridges and recesses on an inside periphery thereof;
   said ridges and recesses each being inclined in a direction extending longitudinally inwardly and radially outwardly and being disposed in overlying relation to said grooves and ribs, respectively, to press portions of said fibrous material into said grooves, thereby forming a torsion-transmitting connection therebetween.

20. A drive shaft according to claim 19, wherein the inclination of said ribs is steeper than that of said grooves such that the radial depth of each groove increases in a longitudinal inward direction.

21. A drive shaft according to claim 19, wherein said lock sleeve includes a plurality of circumferentially spaced lock tabs which are received in associated apertures in said sleeve.

* * * * *